United States Patent
Royle

(10) Patent No.: US 6,880,477 B2
(45) Date of Patent: *Apr. 19, 2005

(54) WAVE SHOCK ABSORBER SYSTEM

(76) Inventor: Ian Arthur Royle, 11700 Dover St., Houston, TX (US) 77031

( * ) Notice: Subject to any disclaimer, the term of this patent is extended or adjusted under 35 U.S.C. 154(b) by 0 days.

This patent is subject to a terminal disclaimer.

(21) Appl. No.: 10/695,706

(22) Filed: Oct. 29, 2003

(65) Prior Publication Data

US 2004/0083939 A1 May 6, 2004

Related U.S. Application Data

(63) Continuation-in-part of application No. 09/951,603, filed on Sep. 13, 2001, now Pat. No. 6,647,910.
(60) Provisional application No. 60/232,545, filed on Sep. 14, 2000.

(51) Int. Cl.[7] .................................................. B63B 43/10
(52) U.S. Cl. ........................................ 114/67 R; 405/22
(58) Field of Search .............................. 114/67 A, 67 R; 405/21–23, 25, 215

(56) References Cited

U.S. PATENT DOCUMENTS

| 743,171 A | 11/1903 | Jamieson |
| 1,195,857 A | 8/1916 | Royston |
| 1,591,748 A | 7/1926 | Dieckmann |
| 3,288,236 A | 11/1966 | Padial |
| 3,981,260 A | 9/1976 | Hilbig |

*Primary Examiner*—Jesus D. Sotelo

(57) ABSTRACT

The invention relates to methods for absorbing impacting shock loads from waves on marine hulls by using a diffuser to provide a reduced impact zone forward of the hull and to divide the wave and cause the non-compressible liquid of the wave to mix with air in the diffuser channels to form a compressible fluid to further absorb impacting shock loads. This system was invented to provide for wave shock absorption of wide bow flat-bottomed marine hulls. These hulls being more buoyant and stable, provided more usable space, while possessing very efficient planning hulls that are easier to manufacture than three dimensional pointed bow hulls.

16 Claims, 7 Drawing Sheets

WAVE SHOCK ABSORBER SYSTEM

This application is a Continuation-in-part of U.S. patent Ser. No. 09/951,603, filed Sep. 13, 2001, now U.S. Pat. No. 6,647,910 dated Nov. 18, 2003 and claims priority to the U.S. Provisional Patent Application Ser. No. 60/232,545 filed Sep. 14, 2000.

BACKGROUND OF THE INVENTION

(1) Technical Field

This invention relates to methods for absorbing impacting shock loads from waves by using a diffuser to provide a reduced impact zone forward of a hull or structure and to divide and cause the non-compressible liquid of the wave to mix with air in the diffuser channels to form a compressible fluid to further absorb impacting shock loads. The elements of the diffuser can be fixed, or can be movable by mechanical, electrical means and can be controlled manually or electronically to anticipate wave impact or adjust during impact. The diffuser system was invented primarily to provide for wide bow craft allowing high buoyancy, high stability, more usable space and a flat bottomed planing hull consistent with better methods of manufacture, high strength and lower cost of manufacture of marine craft and to protect fixed seawall, breakwater structures and the like, from wave impact.

The elements of the diffuser can also be oscillated or rotated to further assist diffusion of the wave.

The invention also applies to absorbing impact loads from semi solids like snow and mud that are undulating and would normally cause impact with the front of the sleds, skis or snowmobiles, rotor and engine/wheels.

(2) Background Information

For thousands of years the bows of boats have been shaped typically to a point to reduce impact with waves from a concentrated impact to a gradual impact over a time span. The bow has been made in many forms including pointed, chamfered, bulbous, contoured, angled. The shape has limited the forward section of hulls in volume for practical use, and caused costly construction.

The new invention decreases concentrated impact with waves providing absorption of the impact over a longer period of time. The invention provides shock absorption by presenting a plurality of surfaces with spaces between them being described as a diffuser to reduce the impact through applying the hull gradually to the force of the wave and by mixing the liquid with the air already between the plates of the diffuser to produce a compressible fluid to further absorb impact.

Two types of hulls dominate the marine industry. The first type is known as a displacement hull. When it floats, it must displace its own weight of water. When it moves, it must continue to displace its own weight of water to be able to travel. Obviously, the inertia of the water being displaced requires energy and to move quickly the inertia becomes impossible to overcome with a practical amount of propulsion energy. The displacement hull normally has a pointed or sharp bow to part the waves to allow progress.

The second type is a planing hull. At rest, it displaces its weight in water as with a displacement hull. However, it is a shallow draft, wider hull, and as it is propelled forward, it tends to rise up on the surface of the water and at the planing stage, it is no longer displacing water. Being a wide hull, it is difficult to operate when waves are present because of intolerable wave impact.

OBJECTIVES AND ADVANTAGES

With this invention, the intended practical use of marine craft, that better accommodates people and goods is now possible. In regard to marine use, a further advantage of the diffuser hull version of the wave shock absorber systems is to add air to the diffuser fluid to form a compressible fluid to reduce impact on the hull and as a secondary product, to reduce suction between the water and hull thereby reducing drag. The diffuser can also be used on the stern of a hull to reduce suction during displacement running. Deployed shock absorber systems to disperse shock waves on aircraft surfaces are also possible using this invention.

The wave shock absorber hull, because it provides for wave impact control of a wide hull allows for a hull that is faster, more energy efficient, has high buoyancy (more seaworthy) high stability (less prone to capsize) uncompromised space availability. Manufacture of the wave shock absorber hull will solve many of the cost problems associated with present state of the art craft.

Manufacture of the wave shock absorber hull will solve many of the problems associated with the construction of displacement hulls. Displacement hulls must be built with continuous curving surfaces from stem to stern. These surfaces are all 3 dimensional. To try to compromise these laws reduces the efficiency of the displacement hull. A further problem is that the displacement hull can only be operated efficiently at the speed as designed. Therefore, each type of displacement hull is designed for its intended purpose and a narrow speed range. Each hull is a special purpose shape from a special purpose mold.

The shock absorber hull can be manufactured to any length and to any width, as there is NO FLUID DYNAMIC SHAPE RESTRICTION for OPERATION or EFFICIENCY. THERE IS NO NEED FOR CURVED SURFACES, GREATLY SIMPLIFYING MANUFACTURING COSTS and PRODUCT INTEGRITY.

Manufacturing Benefits:

(a) Simpler construction because of 2 dimensional shapes.

(b) Lower cost 'off the shelf' materials.

(c) Lower process costs for 'in-plant' manufacturing.

(d) Lower cost materials & process.

(e) Higher quality product through 2 dimension CONTINUOUS SECTION MATERIALS.

(f) Larger range of materials, particularly composites and metals.

(g) Lower product liability through 'off the shelf' or easily inspected wrought or composite mass produced materials.

(h) Much lower cost of production. Boosts marketability and profit margin.

THE INVENTION PROVIDES A VERY BROAD RANGE of MARINE CRAFT AVAILABLE FROM ONE MANUFACTURING SOURCE, INCLUDING DEPARTMENT OF DEFENSE ORDERS FOR ASSAULT TROOP AND EQUIPMENT CARRIERS.

Benefits to users are greater safety through higher buoyancy, higher stability, higher structural integrity and higher floatation. The cost is lower because of simpler construction.

The high buoyancy hull provided by the wave shock absorber hull provides a very low draft which allows the craft to be deployed in shallow water, coral reefs, wetlands, etc. with minimal ecological disturbances. Present marine craft have deeper draft because of the limited floatation caused by the geometrical restriction of the bow.

RECAP

Provides for better shape for better efficiency use of rectangular space and non-curved surface instead of rounded.

Provides housing for engine and amphibious gear because diffuser construction reinforces the bow to a higher strength level.

Provides more capacity for design appearance.

Provides the ability to mix gas with liquid to reduce impact and suction on the hull, to increase speed or decrease power necessary to drive hull.

Provides the bases for a flat bottom hull for maximum buoyancy and maximum planing capability, which leads to greater stability at rest and at speed.

Provides better structural simplicity/flat sides, flat bottom, rectangular structure and parallel longitudinal shape not attainable with pointed bow.

The same system can be applied to the stern of craft to reduce the stern wave effect.

The wave shock absorbing system has a cap on top of the forwardly mounted section to provide for the upward containment of the wave and wave gas mixture to protect the vehicle from water and spray and force the gas and liquid mixture downward under the hull.

The present pointed bow wastes energy in forcing liquids sideways, producing a bow wave. This energy is lost to the sea. The shock absorber bow also controls and reduces spray and splashing on the craft.

This invention, because it incorporates inherently high structural strength, provides for the attachment of engines, propulsion units and amphibious gear and drive systems for marine craft. In conventional marine craft, the engine and propulsion systems are mounted usually in the stern, in specially constructed mounting systems to spread the load through the boats structure. The bow in addition must be reinforced to absorb wave shock placing the two structures a boat length apart. Where the present invention is incorporated, the bow is a reinforced structure incorporating the engines and propulsion system in one assembly, greatly increasing structural integrity, and greatly reducing design, manufacturing, assembly and maintenance costs. The direct mounting of the engine and propulsion system, also acts to deaden residual impact shock from the craft through direct short span inertial absorption.

The invention also provides for the mounting of amphibious gear and drive systems for all of the same reasons, and is in an ideal position for steering and ramp retrieval.

Placing the higher percentage of weight in the bow also provides a better planing center of gravity position allowing quicker planing initiation and a considerable reduction in stern wave production, saving on energy consumption and providing greater speed.

Placing the propulsion system forward in the diffuser bow allows the propulsion system to operate in undisturbed water, reducing cavitation on the propulsion system (propellers) thereby providing a more efficient propulsion (tractor) system. In conventional stern drives systems, propellers are washed in gas dissolved or mixed in water, decreasing power through cavitation, particularly in tunnel hulls.

A further objective of the invention is to use movable diffuser elements. One object is to oscillate, rotate, extend and retract the diffuser plates and forwardly mounted plates to repetitiously contact the waves and to mix air with the wave to reduce impact and reduce suction on the diffuser and hull structure. This can be achieved manually or with power.

Another object is to move the diffuser elements by manual mechanical or electric means during wave impact or in anticipation of wave impact by sensing the pattern or intensity of the wave thereby providing the best setting for wave diffusion during or in advance of wave formation. Sensing would be by sight, beam pressure, mechanical, radar, sonar or sound. The data could be processed manually or preferably by electronic means, particularly using artificial intelligence (AI) systems and fuzzy logic to produce a highly efficient wave diffuser system.

A further object and valuable advantage of the diffuser system is to provide heat exchange for onboard cooling systems. Through necessity, the diffuser has a plurality of surfaces that are in contact with disturbed air and water providing an extensive surface. By using tubular structures and providing access to the back of structural panels, an extremely efficient exchange of heat with the air and wetted surfaces is provided.

The diffuser bow version with forward engine provides for an uncluttered transom which can also be used for entry and exit from the craft by lowering the transom.

The diffuser offers a structure that can be mounted remotely in front of a blow of any shape to reduce wave impact.

The diffuser bow is very suitable for larger applications including a large flat rectangular floor [deck] for fishing, camping, and recreational water sport, being of full width, full length, and predominantly square cornered. Maximum stability and minimum draft is achieved and also suitable for vehicle transport carrying. The diffuser bow is ideal for multi-hull craft where wide hulls are necessary for cabins and bulk carrying capacity, like containers or car ferries and cruise ships. The shock absorber bow is also very suitable for seaplane hulls and floats as they plane more readily than pointed, contoured or bulbous bow hulls and reduce spray and splash as a diffuser automatically collects and forces water and air water mixture downwards and not up or sideways to collect the mixture of air and water to free the bottom of the hull from suction providing takeoff with less power and a softer landing. The shock absorber bow is also suited to situations like water skis, snow skis or snowmobiles, to reduce this shock and resistance felt by the present turned up fronts and leading edges.

The diffuser bow and stern also has advantageous applications in seaplanes to reduce the leading edge shock.

The wave shock absorber principle can be used in present pointed, bulbous, or chamfered bows to improve shock absorption of wave forces. It is not restricted to squared bows. The shock absorber system can also be used in roofs, decktops or screens to reduce concentrated storm loads on these structures.

The shock absorber system can be served by the use of mesh screen and grating structures. The partition wall of diffuser can be angled, curved or reduced in section, width, or length to produce the desired deflection collection or dispersion of the fluid for best results in the particular application. For example, driving fluid down for better lift of the craft.

This density or spacing of the shock absorber structure need not be even in space across the shock absorber bow but can be varied to increase or decrease loads, for example greater loads can be taken at top or bottom of sides of a structure or wherever the structure is able to resist the load.

The shock absorber bow provides a better structure for architectural innovation, particularly the use of textures in metal surfaces for appearance, better sales of product through better aesthetics. For example, black to show a large intake popular in promoting aircraft type technology and the use of metal type finishes to promote quality and decorative finish integrity. The new bow has immediate application in barges to diffuse waves and even out velocity to reduce variations in speed thereby reducing losses through kinetic energy through acceleration and de-acceleration of the load. Further, the diffuser system can be below the hull line for protection of the hull or to take the downward mixture below leading edge of hull. The new system can also terminate above or at the waterline to reduce plate friction in some applications, for example, where hull is planing in smooth water (no wave formation). The invention can be used on the leading edge of the airfoil/hydrofoil to diffuse the shock load of the fluid and cause frictional load of the airfoil/hydrofoil. This diffuser system can be coarse or extremely fine towards the molecular side of the fluid. The Diffuser system can be applied to the walls/side/bottom/top of the hull structure to decrease side shocks of waves or similar forces of fluid and could also be used on the side or rear of fuselages or hulls to disperse low and high speed shock waves.

It is also an object of the invention to provide a system where the diffuser elements can be mechanically electrically or electronically adjusted to anticipate the size and intensity of the wave formation to further reduce impact intensity or by sensing the rate of buildup of an independent wave including the direction of wave that is adjusted during wave impact or anticipated wave impact, by mechanical electric or electronic means to reduce wave impact using manually or through sensors or by artificial intelligence systems.

SUMMARY OF THE INVENTION

The invention comprises a plurality of forward facing surfaces with open spaces between them forming channels and a supporting structure to locate the surfaces. It is also an objective of the invention to oscillate, extend and retract or rotate the surfaces to further assist in wave diffusion.

It is also an objective of the invention to incorporate a system for changing the position of the diffuser elements by mechanical, electrical or electronic means to further enhance wave shock absorption. The position changes can be made in anticipation or during impact and can be manual or electronically controlled through the use of sensors and computerization including artificial intelligence systems.

It is also an objective of the invention to use the diffuser to protect fixed seawalls, river banks, bulkheads, and breakwater structures from wave impact.

It is also an objective of the invention to use the inherently high strength supporting structure to reinforce the attached structure and in the case of hulls, to house power plants, propulsion systems and in the case of amphibious vehicles to house land wheels and drive systems.

It is also an objective of the invention to use the shock absorber for aesthetic improvement of craft. It is also an objective of the invention to provide versions that can be deployed or retracted to suit weather or impact conditions in liquid or gaseous applications (marine, land, or aerospace).

It is also an objective of the invention to provide a cavity between the hull and the rear edge of the forward mounted section to further mix air with the wave and equalize pressures caused by uneven wave impact.

DETAILED DESCRIPTION OF THE PREFERRED EMBODIMENTS

Figure 1:
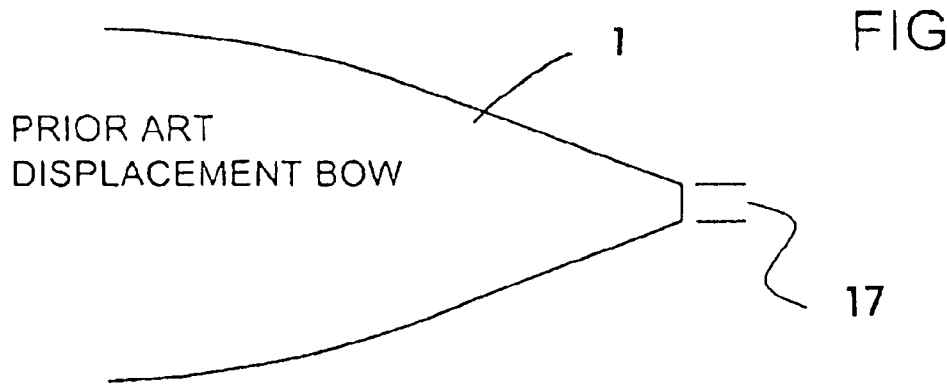
FIG. 1 illustrates the pointed displacement bow of the prior art.

FIG. 1 shows a plan view of the prior art of typical displacement bow 1 made pointed to reduce impact zone 17.

Figure 2:
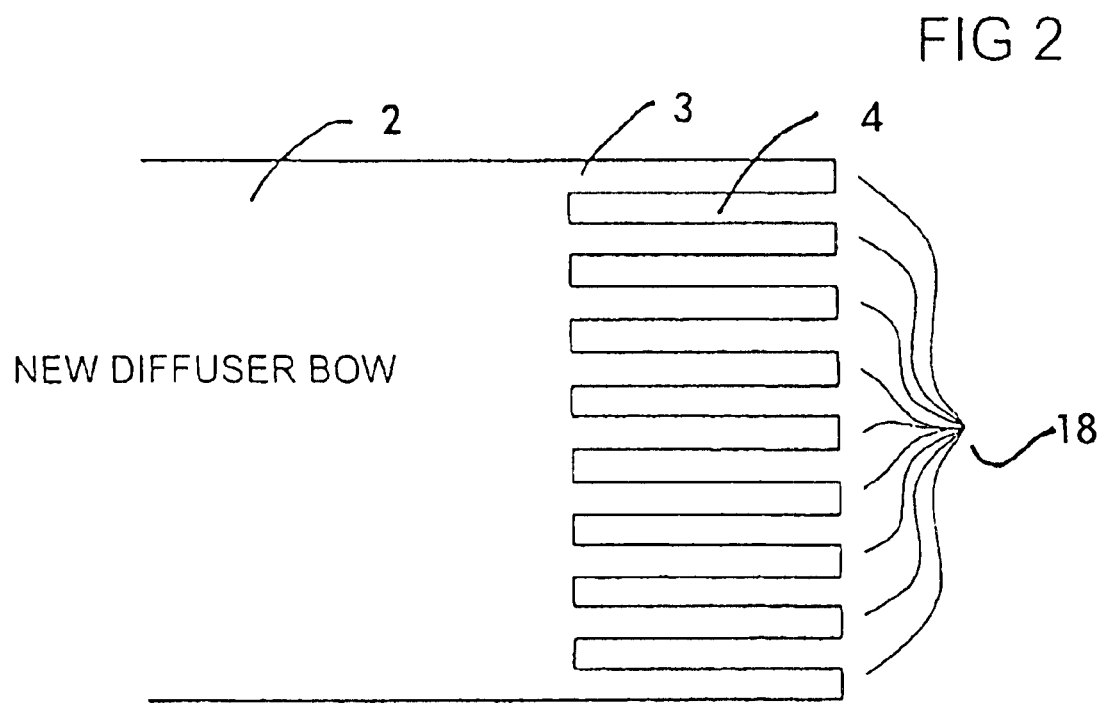
FIG. 2 illustrates the shock absorber hull (diffuser bow) showing the more usable shape.

FIG. 2 shows a plan view of the diffuser bow 2 having multiple plates 3 and channels 4 providing a diffuser structure. These channels provide for mixing air with the wave in the diffuser to provide a compressible fluid to reduce impact and reduce suction between the hull and the water and providing reduced impact zones 18 extending over a wide bow.

Figure 3:
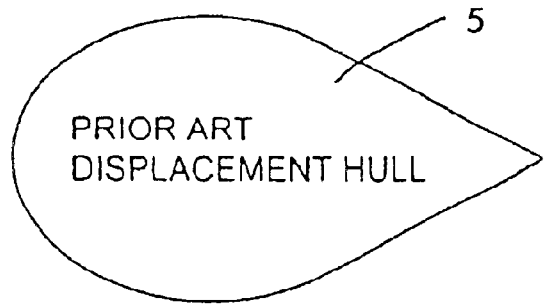
FIG. 3 illustrates the typical prior art displacement hull with its low buoyancy, low stability and limited space and illustrates the typical fluid dynamic shape required for a limited speed range.

FIG. 3 shows a plan view of the prior art of a typical displacement hull 5 with inherent low buoyancy, low stability, and limited usable space.

Figure 4:
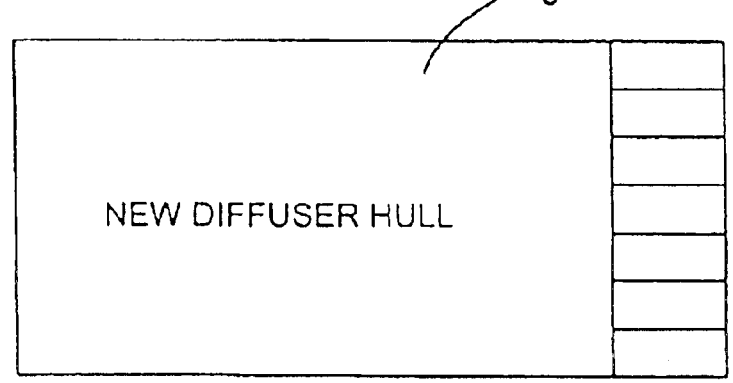
FIG. 4 illustrates the more useful shape of the shock absorber hull with its high buoyancy, high stability, and maximum space. This hull is also a planing hull, incorporating the advantages of the invention.

FIG. 4 shows a plan view of the diffuser hull 6 with inherent high buoyancy, high stability, and maximum usable space.

Figure 5:
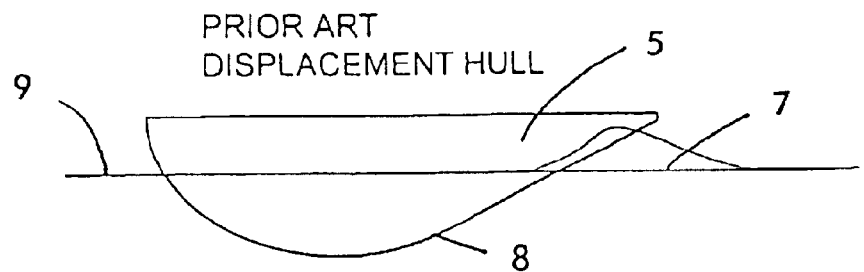
FIG. 5 further illustrates the prior art displacement hull, pointed bow and the high displacement losses.

FIG. 5 shows an elevation of a typical displacement hull 5 showing the wave 7 being parted on impact and showing the displacement 8 of the hull below the waterline 9 that must displace in own weight in water to move through the water.

Figure 6:
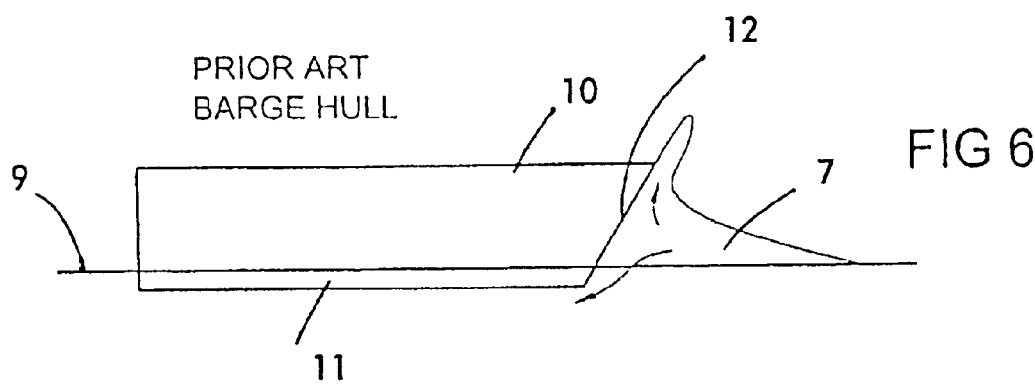
FIG. 6 illustrates the energy losses from wave impact of the prior art wide bow barge type hull.

FIG. 6 shows an elevation of a typical barge hull 10 illustrating the low displacement 11 below the waterline 9 but shows the high impact losses caused by the wave 7 impacting the flat bow of the barge 12.

Figure 7:
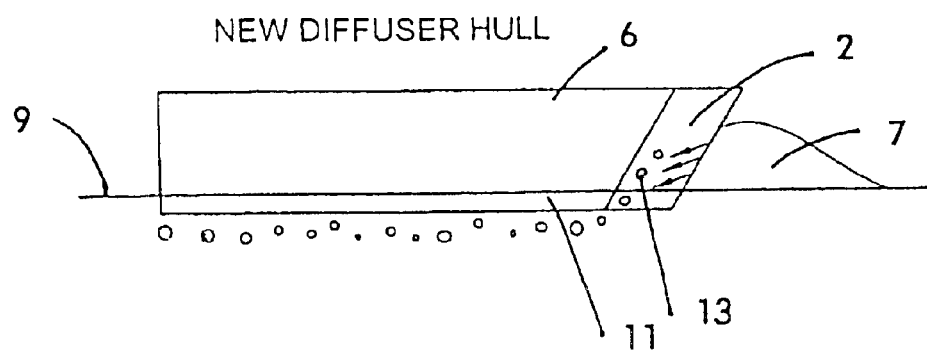
FIG. 7 illustrates the shock absorber hull with its low impact losses, low displacement losses and mixing of air with the wave in the diffuser to further reduce suction on the hull surfaces.

FIG. 7 shows an elevation of a diffuser hull 6 with its low displacement 11 below the waterline 9 providing the low displacement advantages of the barge hull 10, but with the reduces impact of the diffuser bow 2. Also shown is the diffused water mixed with air 13 that reduces impact due to the mixing of gas and liquid to form a compressible fluid and illustrates the secondary effect of the aerated liquid reducing suction between the hull and the water.

Figure 8:
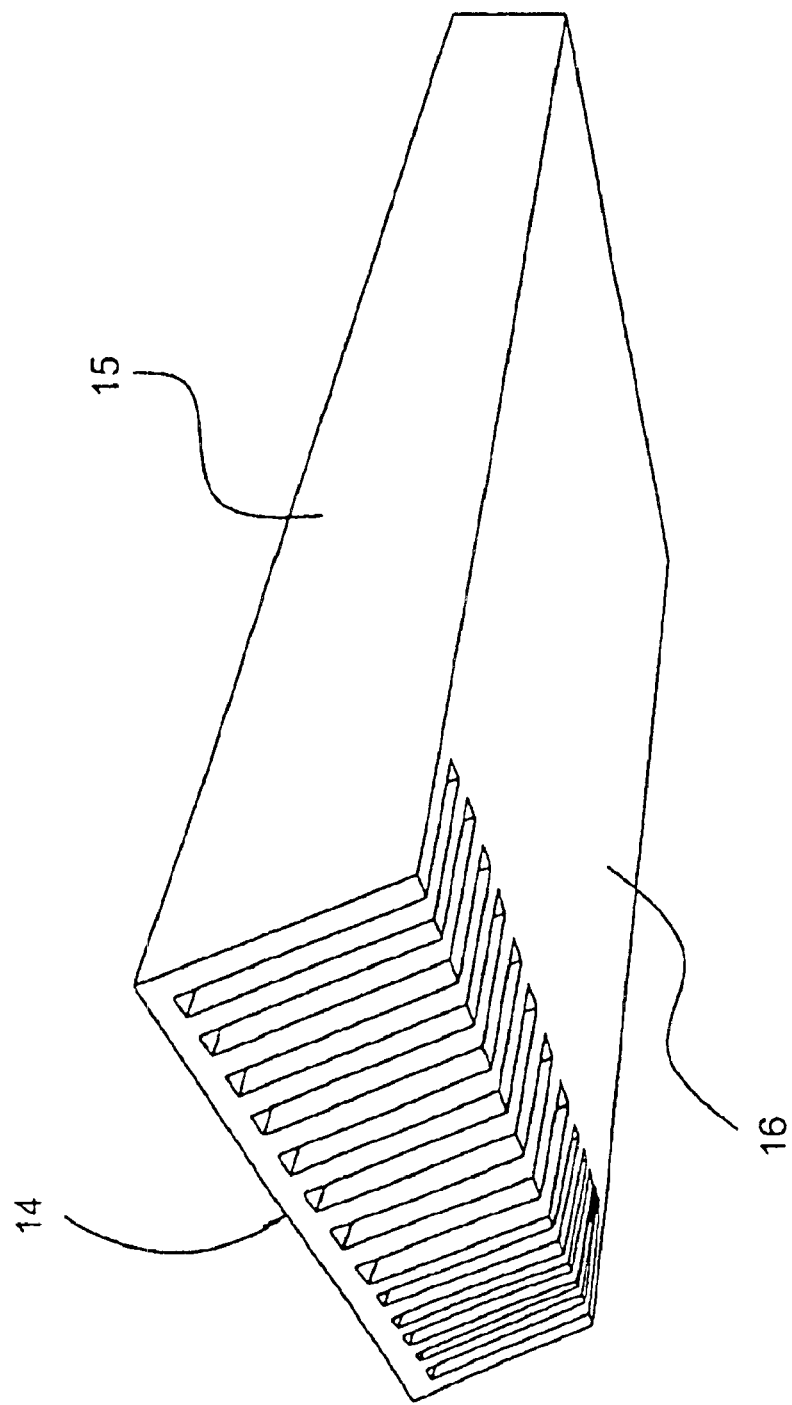
FIG. 8 illustrates the diffuser bow as built into a wide planing hull showing the simplicity of the new invention in this preferred embodiment version of the wave shock absorber system.

FIG. 8 shows an isometric view of the preferred embodiment showing the diffuser bow 14, side 15 and hull bottom 16.

Figure 9:
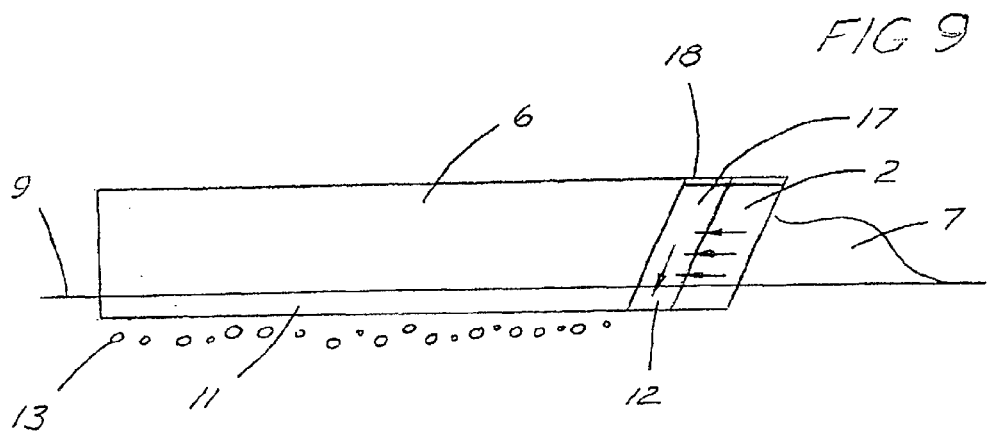
FIG. 9 illustrates an elevation of a diffuser hull with its low displacement below the waterline providing the low displacement advantages of the barge hull, but with the reduced impact of the diffuser bow. Also shown is the diffused water mixed with air that reduces impact due to the mixing of gas and liquid to form a compressible fluid and illustrates the secondary effect of the aerated liquid reducing suction between the hull and the water. Also shown is a cavity between the hull and the diffuser bow that further mixes the diffuser water with air and equalizes any uneven pressure due to variation in wave position and intensity across the diffuser. Also shown is a cap on the diffuser to prevent spilling of the liquid or gas or mixture of both, upwards.

FIG. 9 shows an elevation of a diffuser hull 6 with its low displacement 11 below the waterline 9 providing the low displacement advantages of the barge hull 10, but with the reduced impact of the diffuser bow 2. Also shown is the diffused water mixed with air 13 that reduces impact due to the mixing of gas and liquid to form a compressible fluid and illustrates the secondary effect of the aerated liquid 13 reducing suction between the hull and the water. Also shown is a cavity 17 between the hull 6 and the diffuser bow 2 that further mixes the diffuser water 12 with air and equalizes any uneven pressure due to variation in wave position and intensity across the diffuser. Also shown is a cap 18 on the diffuser to prevent spilling of the liquid 7 or gas or mixture of both 13, upwards. Allows higher pressure fluid from extreme wave shock to exhaust through side panel.

Figure 10:
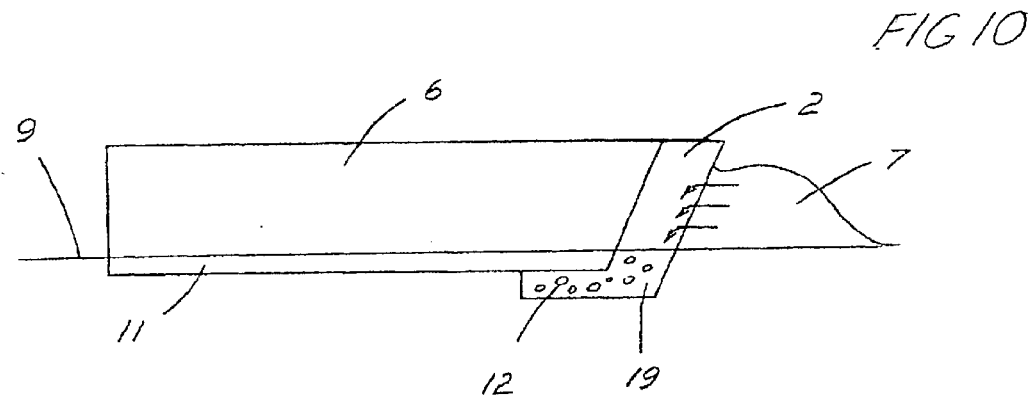
FIG. 10 illustrates an elevation of a diffuser hull with its low displacement below the waterline providing the low displacement advantages of the barge hull, but with the reduced impact of the diffuser bow. Also shown is the diffuser water mixed with air that reduces impact due to the mixing of gas and liquid to form a compressible fluid and illustrates the secondary effect of the aerated fluid reducing suction between the hull and the water. Also shown is an extension of the diffuser channel of the diffuser located below the hull line to contain the aerated fluid under the hull.

FIG. 10 shows an elevation of a diffuser hull 6 with its low displacement 11 below the waterline 9 providing the low displacement advantages of the barge hull 10, but with the reduced impact of the diffuser bow 2. Also shown is the diffused water mixed with air 13 that reduces impact due to the mixing of gas and liquid to form a compressible fluid and illustrates the secondary effect of the aerated liquid 13 reducing suction between the hull and the water. Also shown is an extension of the diffuser channel 19 of the diffuser 2 located below the hull line 11 to contain the aerated fluid 13 under the hull.

Figure 11:
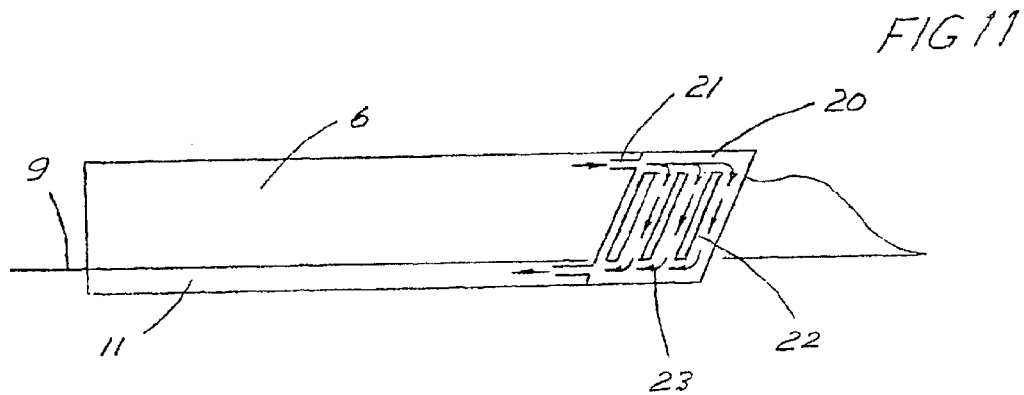
FIG. 11 illustrates the shock absorber with its low impact losses, low displacement and mixing of air with the wave in the diffuser to further reduce impact and reduce suction on the hull surface. Also shown are the hollow diffuser tubes and heat exchanger surfaces used for heat exchanging of on board cooling systems, and the typical route of the engine coolant through the diffuser tubes.

FIG. 11 illustrates a sectional elevation of a diffuser hull 6 with its low displacement 11 below the waterline 9 and showing tubular diffuser structural surfaces 20 used for exchange of heat from engine coolants 21 and the airblown or wetted surfaces of the diffuser 22. The arrows 23 show the typical route of engine coolant through the diffuser tubes.

Figure 12:
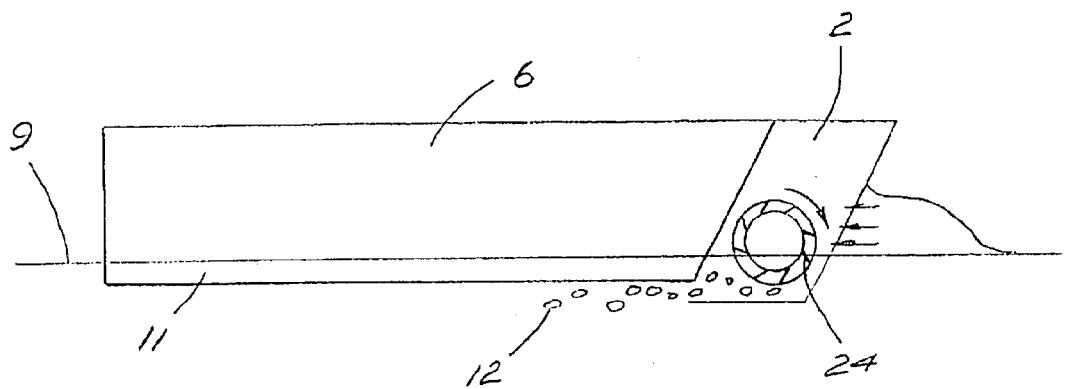
FIG. 12 illustrates the shock absorber with its low impact losses, low displacement and mixing of air with the wave in the diffuser to reduce impact and reduce suction on hull the surface. Also shown is a set of rotating diffuser plates to further diffuse the wave and mix air with the liquid wave and increase the effectiveness of the diffuser and hasten the process.

FIG. 12 shows an elevation of a diffuser hull 6 with its low displacement 11, shows an elevation of a diffuser hull 6 with its low displacement 11 below the waterline 9 providing the low displacement advantages of the barge hull 10, but with the reduced impact of the diffuser bow 2. Also shown is the diffused water mixed with air 13 that reduces impact due to the mixing of gas and liquid to form a compressible fluid and illustrates the secondary effect of the aerated liquid 13 reducing suction between the hull and the water. Also shown is a set of rotating diffuser plates 24 to further diffuse the wave and mix air with the liquid wave and increase the effectiveness of the diffuser.

Figure 13:
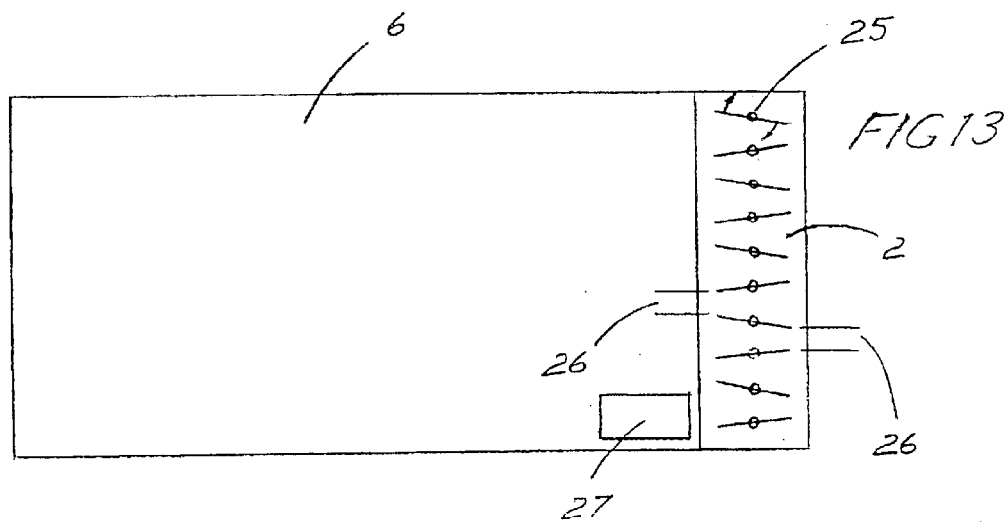
FIG. 13 illustrates the shock absorber with its low impact losses, low displacement and mixing of air with the wave in a diffuser to reduce impact and reduce suction on the hull surface. Also illustrated is a diffuser with elements that can be moved and can be preset to a more advantageous position to anticipate a wave impact or can be moved during the impact to further improve the effectiveness of the wave diffuser. Also illustrated is the preferred embodiment electronic control sensor and operating mechanism container.

FIG. 13 shows a plan view of a diffuser hull 6 and diffuser 2 showing pivotal diffuser plates 25 positioned to provide varying apertures 26 to change the resistance of the diffuser to wave impact.

Also shown in this preferred embodiment is the electronic control sensors and operating mechanisms 27 that senses and operates the diffuser elements in anticipation of impact or during impact, to further improve the efficiency of the wave diffuser system.

Figure 14:
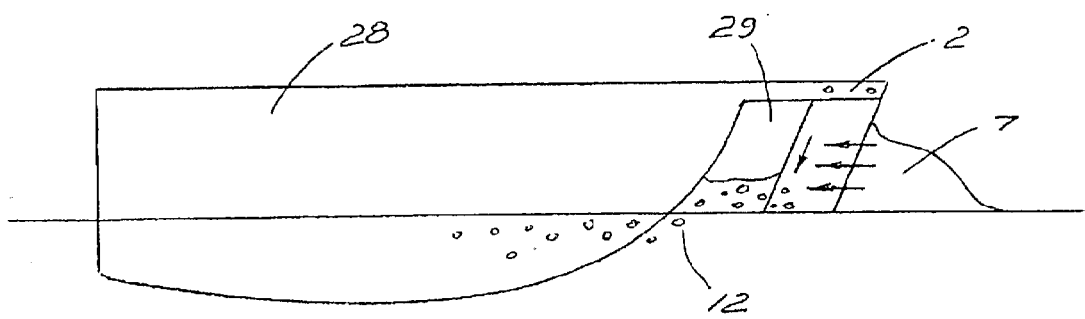
FIG. 14 illustrates the diffuser assembly mounted in front of, and remotely from, a conventional marine hull, to diffuse the wave and mix air with the wave to reduce impact and reduce suction on the hull surface.

FIG. 14 shows an elevation of a conventional hull 28 provided with a wave diffuser assembly 2 mounted forward and remotely from the hull 28 to provide a gap 29 to provide for fitment to hulls not limited in shape. Also shown is the diffuser 2 reducing impact of wave 7 by diffusion and mixing air with wave 12 to further reduce impact and reduce suction on the hull.

Figure 15:
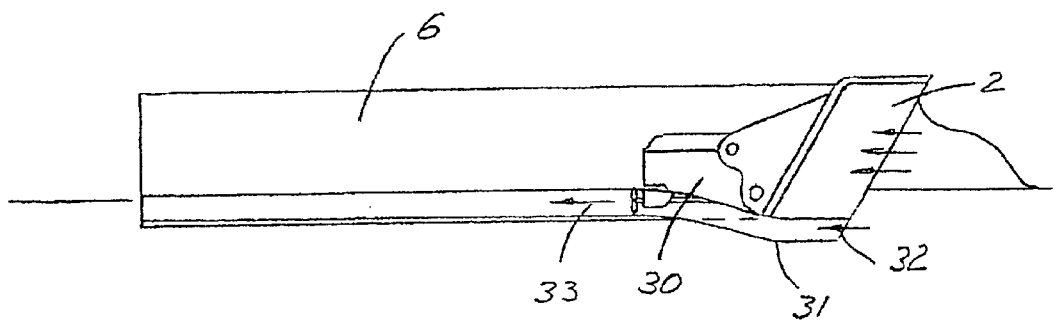
FIG. 15 illustrates the diffuser assembly that provides for the incorporation of the propulsion system of a craft. The diffuser assembly being inherently a high strength structure imparts structural integrity to the craft.

FIG. 15 shows an elevation of diffuser hull 6 and diffuser assembly 2 that incorporates the propulsion system 30. The diffuser assembly 2 being inherently a high strength structure imparts structural integrity to the hull 6. Also shown is the propulsion intake 31, with its 'pick up' in undisturbed water 32 showing the route of the water 33 through the propulsion system.

Figure 16:
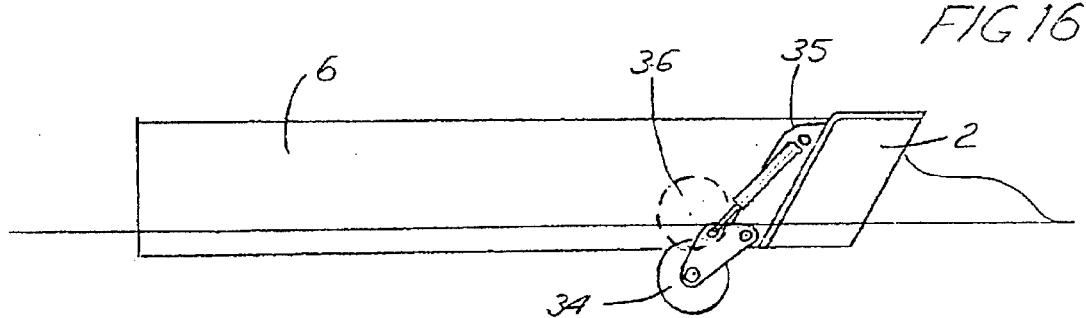
FIG. 16 illustrates the diffuser assembly that provides for the incorporation of the land wheels of an amphibious craft. The diffuser assembly being inherently a high strength structure imparts structural integrity to the craft.

FIG. 16 shows an elevation of a diffuser hull 6 and a diffuser assembly 2 that incorporates the land wheels 34 and drive system 35 of an amphibious craft. The diffuser assembly 2 being inherently a high strength structure imparts structural integrity to the hull 6. Also shown is the landing wheel in the retracted position 36.

Figure 17:
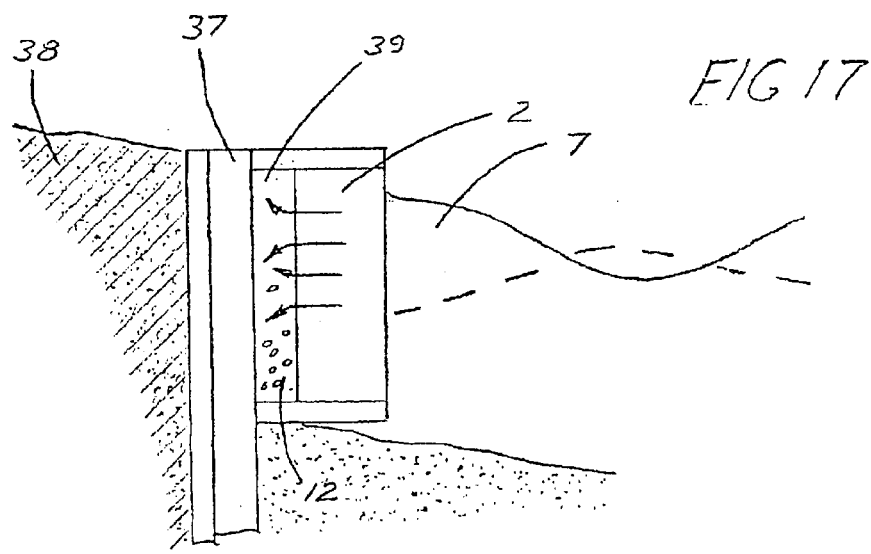
FIG. 17 illustrates a version of the diffuser that is attached to a seawall bulkhead to reduce wave impact shock.

FIG. 17 shows a sectioned elevation of a diffuser assembly 2 attached to a seawall bulkhead 37 that is protecting a seawall 38 from wave 7. Also shown is a gap 39 to assist in dispersion of diffused wave and mixing wave with air to form mixture 12.

What is claimed is:

1. A marine vehicle having a hull provided with a bow, a wave shock absorbing system incorporating structural means for absorbing wave shock comprising a plurality of forwardly mounted sections of predetermined width and length and arranged in spaced relationship to each other providing channels between the structural members on the bow to retard wave progression towards the hull by diffusing waves.

2. The marine vehicle of claim 1 where the channels are adapted to channel air and reduce suction on the wave shock absorbing system and under the hull.

3. The marine vehicle of claim 1 where the channels have a long elongated configuration that extends under the hull.

4. The marine vehicle of claim 1 wherein the hull has a rectangular shape.

5. The marine vehicle of claim 1 where the forwardly mounted sections are adapted to channel coolant fluids through the sections to cause heat exchange between the said coolant and air-cooled or wetted surfaces of the mounted sections.

6. The vehicle of claim 1 wherein the hull has a non-curved surface.

7. The vehicle of claim 1 where the channels are adapted to divide water and mix with air to form compressible fluid to absorb shock imparted on the bow while the marine vehicle is moving through the waters.

8. The vehicle of claim 1 where the said forwardly mounted sections are positioned in the wave shock absorbing system to provide a cavity between the sections and the hull to further mix air with the wave and equalize pressures caused by uneven wave impact.

9. The vehicle of claim 1 where the said wave shock absorbing system is mounted remotely in front of a bow of any shape to reduce wave impact on the said bow.

10. The vehicle of claim 1 where the said wave shock absorbing system has a cap on top of the said forwardly mounted section to provide for the upward containment of the wave and wave gas mixture to protect the said vehicle from water and spray and force the gas and liquid mixture downward under the said hull.

11. The vehicle of claim 1 where the said forwardly mounted sections are terminated at the waterline or above to prevent wave shock absorbing system operation where no waves are present.

12. The vehicle of claim 1 where the forwardly mounted sections are adapted to rotate to provide repetitious contact with the wave to hasten diffusing the wave and mixing of air with the wave to retard wave shock.

13. A marine vehicle of claim 1 adapted to provide adjustable forwardly mounted sections incorporating sensing means for anticipating wave impact and urging means for moving the said adjustable forwardly mounted sections to provide optimal wave diffusion and air and water mixing to retard shock.

14. The vehicle of claim 1 where the wave shock absorbing system being through necessity a high strength structure is adapted to house the craft's propulsion structure.

15. The vehicle of claim 1 where the wave shock absorbing system being through necessity a high strength structure is adapted to house the land wheels and drive system of an amphibious vehicle.

16. A wave shock absorbing system incorporating structural members for absorbing wave shock comprising a plurality of forwardly mounting sections of predetermined width and length and arranged in spaced relationship to each other providing channels between the structural members to retard wave progression adapted to attach to one of fixed seawalls, bulkhead, and breakwater structures to reduce impact shock on the said one of fixed seawall, bulkheads, and breakwater structure.

* * * * *